United States Patent Office 2,757,391
Patented Aug. 7, 1956

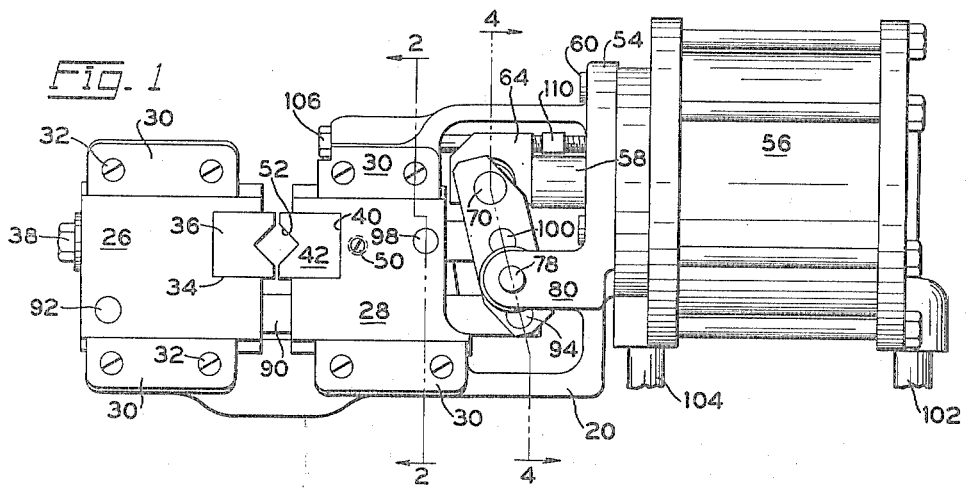
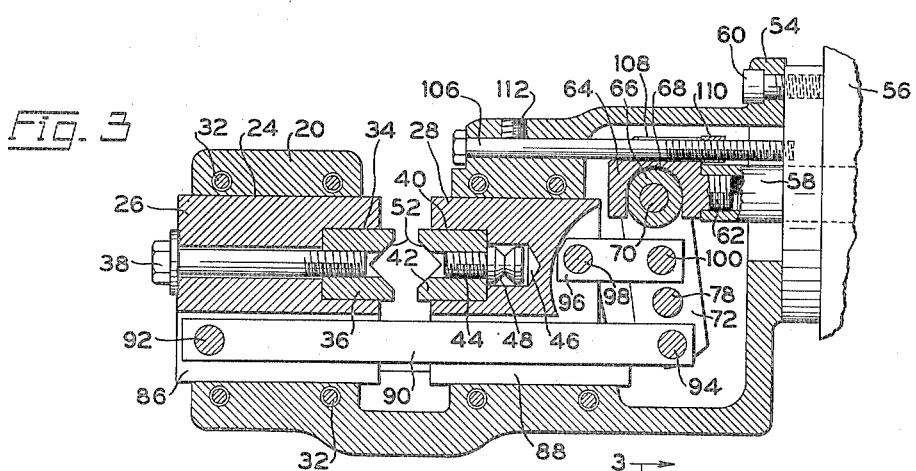
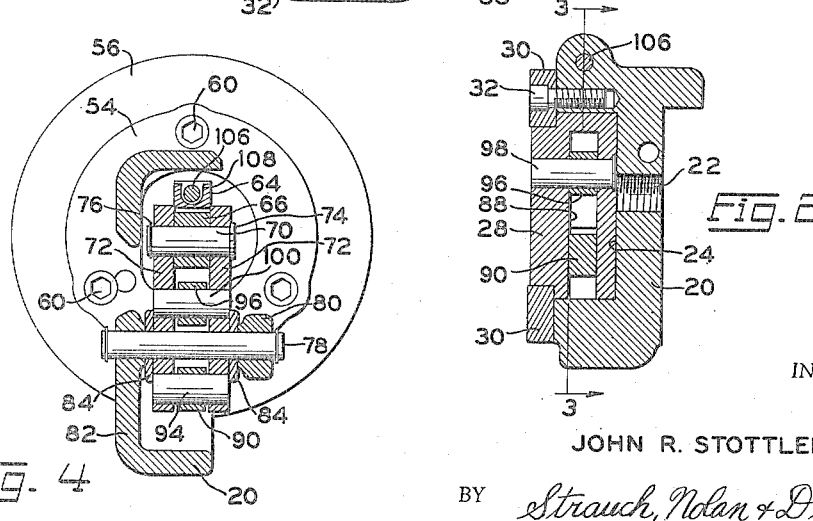

2,757,391

PARALLEL LINK SYSTEM FOR ACTUATING WORK GRIPPING JAWS

John R. Stottlemyer, Cascade, Md., assignor to Landis Machine Company, Waynesboro, Pa., a corporation of Pennsylvania Application February 4, 1953, Serial No. 335,085

5 Claims. (Cl. 10—107)

This invention relates to mechanisms for holding and positioning work pieces for machining operations and in particular to a power-operated work-holding vise for use with a thread cutting machine.

Such vises commonly comprise two opposed jaws which move laterally in opposite directions to seize and release work pieces. The movement of the jaws must be equal in order to grip the work piece at a predetermined central position in exact alignment with the fixed axis of a thread cutting die head or other work forming tool.

In the past, such vises have usually been hand operated, movement of the opposed jaws being effected by rotation of a screw having a right-hand thread operatively connected to one jaw and a left-hand thread operatively connected to the other. Thus, upon rotation of the screw, the jaws undergo equal and opposite movements toward or away from their gripping positions. This operation, while effective, is objectionally time-consuming and the mechanism is not well adapted to automatic or power operation.

In prior constructions designed for automatic or semi-automatic power operation, one jaw is usually held stationary in order to define and maintain the central gripping position, while the opposing jaw only is reciprocated by power means. This construction is unsatisfactory in that it operates effectively only with work blanks which have been machined very accurately to a given size before being gripped. If an individual work blank is under or oversize, the axial center of the blank, when gripped, will be held out of alignment with the machining tool which is to operate upon it. Thus, such a mechanism cannot be effectively used with the large class of forged or rough work pieces which are threaded or hollow milled without previous machining operations. It is also evident that, in such mechanisms, a change from one diameter of work to another necessitates an accurate resetting of the stationary jaw or replacement of the gripping members.

In the work holding device which comprises the present invention, the above-mentioned difficulties are obviated by connecting the two opposed jaws to a lever system to which the motive force is applied. The jaws and the lever system operate so that their movement is at all times equal and opposite with respect to a predetermined work gripping center. Thus, regardless of the size of the work piece, the center of the work piece is always held accurately and firmly at the same position when the jaws are closed. Also in accordance with the present invention the amount of movement of each of the jaws is controlled through a single adjustment, so that a maximum range of operation is obtained by the expenditure of a minimum of time and effort.

Accordingly, it is an object of the present invention to provide a work holding device of the opposed sliding jaw type in which both jaws are moved toward or away from each other equally and simultaneously by a lever system.

Another object is to provide a link connection between both of said jaws and a common lever which is actuated by a single power means, as, for example, a pneumatic cylinder or other fluid motor.

A further object of the invention is to provide means for adjusting the movement of the vise jaws accurately, simply and without affecting the position of the axis of the gripped work piece.

Another object is to provide a work holding device of the opposed sliding jaw type particularly adapted for power operation which will repeatedly grip work pieces of the same or varying sizes with their axes always in the same predetermined central position.

A still further object is to provide mechanism of the above description which is of simple, rigid, and compact construction, is easy to operate and affords maximum working range and centering accuracy.

It is another object of the invention to provide a work-holding device particularly adapted for high speed automatic or semi-automatic operation which may be operated by the reciprocating motion of a single fluid motor.

It is a further object of the present invention to provide a novel work holding device of the opposed sliding jaw type in which provision is made for regulating the movement of each of the vise jaws by means of a single adjustment.

Other objects and advantages will be apparent from a study of the following description and the accompanying drawings in which:

Figure 1 is a front elevation of a work-holding device constructed according to the invention illustrating the work gripping jaws in closed position;

Figure 2 is a transverse sectional view taken along line 2—2 of Figure 1;

Figure 3 is a longitudinal sectional view taken along line 3—3 of Figure 2, and illustrating the jaws in open position; and Figure 4 is a transverse sectional view taken along line 4—4 of Figure 1.

In the present illustrative embodiment, a vise frame 20 is provided with threaded holes 22 for attachment in well known manner to the carriage of a thread cutting machine, although the frame may be modified as desired to adapt it to a wide variety of machine tools. On the side facing the machining tool the vise frame 20 is formed with a rectangular channel 24 in which a pair of opposed vise jaws 26 and 28 are mounted for reciprocal sliding movement. Four gibs 30, secured by screws 32 to the front surface of the vise frame 20 and extending partially across the channel 24, retain the vise jaws 26 and 28 in the channel and prevent movement of the jaws in any except a lateral direction.

The left hand vise jaw 26, as seen in Figure 3, is recessed on its centrally facing surface as at 34 to provide a seat for a work grip 36. A screw 38 is threaded through the work grip 36 and extends laterally through the vise jaw 26 to retain the grip 36 in the recess 34. The opposite, right-hand vise jaw 28 is provided with a corresponding recess 40 to receive a work grip 42. A stud 44 is threaded into grip 42 and extends into a cylindrical socket 46 in the vise jaw 28. The stud 44 is formed with a V-groove 48 for engagement by a set screw 50 (Figure 1). By this means the grip 42 is retained in the recess 40 without utilizing a holding screw extending through the entire vise jaw as in the case of the jaw 26. It is understood that the grips 36 and 42 are provided with opposed central recesses 52 of any character necessary for holding a particular work piece. These recesses 52 are here shown as V-grooves which are adaptable to hold various sizes of cylindrical work pieces.

The vise frame 20 is formed at one side with an integral flange 54 to which a suitable fluid motor, having a cylinder 56 and piston rod 58, is secured by screws 60. The axis of cylinder 56 and of the piston rod 58 is disposed parallel to the direction of reciprocation of the jaws 26 and 28. The piston rod 58 is threaded internally to receive an externally threaded portion 62 (Figure 3) of a yoke 64. A roller 66 is disposed in a U-shaped recess 68 in the bottom surface of the yoke 64 and is rotatably mounted upon a pin 70. The opposite ends of the pin 70 are fitted through suitable openings in a pair of levers 72 and the pin 70 is prevented from moving axially by a head 74 on one end and by a conventional retaining ring 76 (Figure 4) mounted on the opposite end.

The spaced levers 72 are mounted for pivotal movement on a pin 78 which is journalled through opposed portions 80 and 82 (Figure 4) of the vise frame 20. Conventional retaining rings may also be used to prevent axial movement of the pin 78, while washers 84 are preferably interposed between the portions 80 and 82 and the adjacent levers 72. It is evident that any reciprocation of the piston rod 58 will be transmitted to the levers 72 as rocking movement, by means of the yoke 64. The recess 68 in yoke 64 is formed deep enough to accommodate the vertical component of the movement of the roller 66 as levers 72 are oscillated about the fulcrum pin 78.

As shown in Figure 3, the vise jaws 26 and 28 are provided with rectangular slots 86 and 88 respectively. Through these slots and below the work grips 36 and 42, a link 90 is passed to connect a pin 92 mounted in the opposed side walls of the slot 86 with a pin 94 journalled through the lower end of the levers 72. Similarly, a link 96 is disposed in the slot 88 and secured at one end to the vise jaw 28 by a pin 98. At its opposite end, the link 96 is secured between the levers 72 by a pin 100. It will be noted that the points of attachment of links 96 and 90 to the levers 72 are equidistantly above and below the fulcrum point 78, of the levers 72 respectively. Therefore, in any rocking movement of the levers 72 about pin 78 as a center, the pins 94 and 100 will be moved laterally for equal distances but in opposite directions.

Figure 1 illustrates the apparatus after air under pressure has been admitted into the head end of cylinder 56 through the pipe 102 to move the piston to the left. Consequently the yoke 64 has been moved to the left and the grips 36 and 42 are closed on the work piece. In the position shown in Figure 3, air has been admitted to the opposite end of the cylinder 56 through the pipe 104 to move the piston to the right. Therefore grips 36 and 42 are separated because of the movement of yoke 64 toward the right.

A screw 106 is mounted in the vise frame 20 with its axis parallel to the path of movement of the yoke 64. The yoke 64 has a groove 108 in its surface through which the screw 106 passes. A nut 110 is engaged upon the screw 106 to the right of the yoke 64 to limit the movement of the yoke in that direction. The position of the square nut 110 upon the screw 106 may be adjusted by rotating the screw. Thus the amount of opening movement of both of the vise jaws 26 and 28 can be regulated through a single readily accessible adjustment. A set screw 112, threaded into the vise frame 20 radially to screw 106, serves to restrain the latter against rotation and hold it in adjusted position.

It is apparent that the link 90, connected to vise jaw 26, and link 96, connected to vise jaw 28 will cause precisely equal and opposite movements of the vise jaws in a horizontal direction by virtue of their connection at precisely equal distances on opposite sides of the fulcrum 78 of the levers 72. It is also evident that the work piece will be held in precisely the same position upon all operations of the air cylinder 56, so that if the work grips are initially set to close at a central position, they will always accurately return to that central position.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Work gripping means comprising, a frame; a pair of grips mounted in said frame for relative movement toward and away from each other; a pair of links each directly pivotally mounted at one end on one of said grips, said links being substantially parallel to the path of movement of said grips; a lever mounted in said frame for rocking movement about a fulcrum aligned with the path of movement of said grips; means pivotally mounting the other end of each of said links directly on said lever at points on opposite sides of and equally spaced from said fulcrum, the pivotal connections between said links and said lever lying substantially in a plane containing the axis of the fulcrum; a fluid motor attached to said frame, said motor having a piston rod arranged for reciprocating movement in a path substantially parallel to the path of movement of said grips; and means operatively connecting said piston rod to said lever whereby, upon reciprocation of said piston rod, said lever will be rocked about said fulcrum to move said grips in equal increments in opposite directions.

2. The work gripping means as defined in claim 1 together with cooperating means on said frame and said piston rod for limiting the motion of said piston rod in one direction while permitting its free motion in the opposite direction.

3. Work gripping apparatus as defined in claim 2 wherein said cooperating means comprises a threaded rod mounted in said frame and extending through a member on said piston rod and an adjustable abutment positioned on said rod and adapted to contact said member.

4. The work gripping apparatus as defined in claim 1 wherein said means for connecting said piston rod and said lever comprises means forming a substantially U-shaped recess in the free end of said piston rod and a roller mounted on said lever and fitting within said recess.

5. The work gripping apparatus according to claim 1 wherein one of said grips is provided with a through opening and one of said links extends through said opening.

References Cited in the file of this patent

UNITED STATES PATENTS

| | | |
|---|---|---|
| 1,062,465 | Hill | May 20, 1913 |
| 1,317,049 | Smith | Sept. 23, 1919 |
| 2,032,535 | Geist | Mar. 3, 1936 |
| 2,067,492 | Kingsbury | Jan. 12, 1937 |
| 2,341,602 | Dewey | Feb. 15, 1944 |

FOREIGN PATENTS

| | | |
|---|---|---|
| 417,261 | Germany | July 5, 1922 |